US012151862B2

(12) United States Patent
Liceaga et al.

(10) Patent No.: US 12,151,862 B2
(45) Date of Patent: Nov. 26, 2024

(54) ENVIRONMENT FRIENDLY PACKAGING MATERIALS OF CHIA SEED BIOMASS AND THE USES THEREOF

(71) Applicant: Purdue Research Foundation, West Lafayette, IN (US)

(72) Inventors: Andrea M. Liceaga, West Lafayette, IN (US); Uriel Urbizo-Reyes, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 311 days.

(21) Appl. No.: 17/529,386

(22) Filed: Nov. 18, 2021

(65) Prior Publication Data

US 2022/0153492 A1    May 19, 2022

Related U.S. Application Data

(60) Provisional application No. 63/115,812, filed on Nov. 19, 2020.

(51) Int. Cl.
*B65D 65/02* (2006.01)
*A23L 29/238* (2016.01)
*B65D 65/46* (2006.01)

(52) U.S. Cl.
CPC ............ *B65D 65/02* (2013.01); *A23L 29/238* (2016.08); *B65D 65/466* (2013.01)

(58) Field of Classification Search
CPC ...... B65D 65/02; B65D 65/466; A23L 29/238
See application file for complete search history.

(56) References Cited

U.S. PATENT DOCUMENTS

2016/0280869 A1\*  9/2016  Nii .................. C08K 5/0016

OTHER PUBLICATIONS

English machine translation for BR102018011148 (Dec. 17, 2019) (Year: 2019).\*
Wei, R., & Zimmermann, W. (2017). Biocatalysis as a green route for recycling the recalcitrant plastic polyethylene terephthalate. Microbial biotechnology, 10(6), 1302-1307.
Oliveira, N. L., Rodrigues, A. A., Neves, I. C. O., Lago, A. M. T., Borges, S. V., & de Resende, J. V. (2019). Development and characterization of biodegradable films based on Pereskia aculeata Miller mucilage. Industrial Crops and Products, 130, 499-510.

(Continued)

*Primary Examiner* — Michael C Miggins
(74) *Attorney, Agent, or Firm* — Purdue Research Foundation

(57) ABSTRACT

The present application relates generally to a process of manufacturing an optimized packing material comprising chia seed mucilage (CSM), glycerol, and sorbitol, wherein said packaging materials have a good tensile strength (2.005 N/mm$^2$), lower water vapor permeability (1.73×10$^{-9}$ g×s× Pa/m), a good flexibility (e.g. high elongation at break, 31.729%). The optimum conditions of polyol concentration were 1.3 g of glycerol and 2.0 g of sorbitol per g of CSM. Based on these results, chia seed mucilage can successfully be used to develop biofilms with potential to be used in drug delivery and edible food coating applications. Both the process and the products are within the scope of this application.

8 Claims, 8 Drawing Sheets

(56) References Cited

OTHER PUBLICATIONS

Figure 1A:
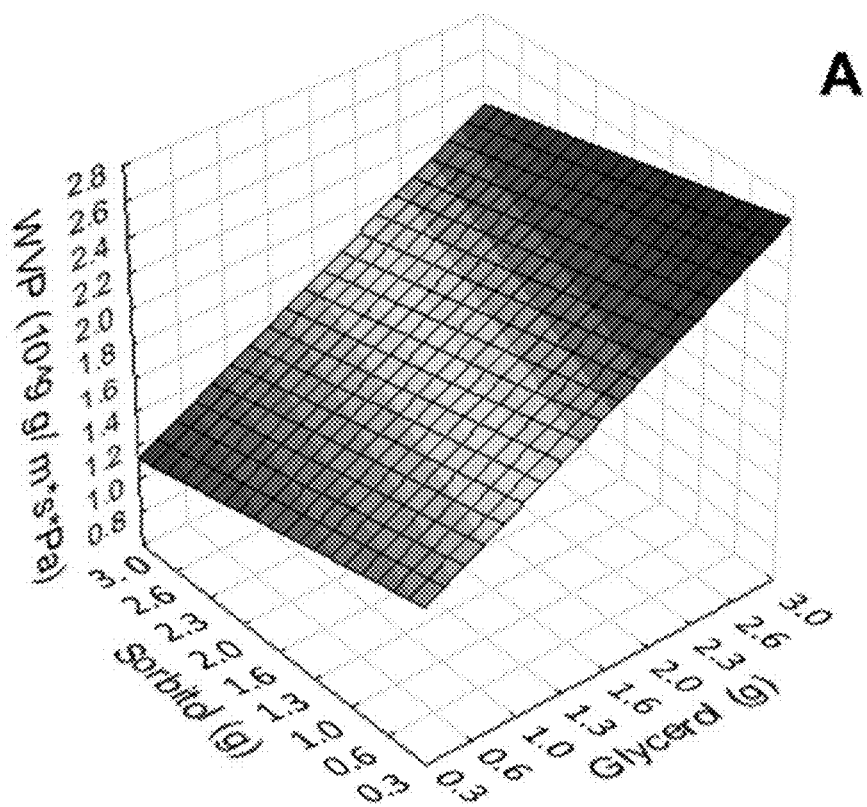
Figure 1B:
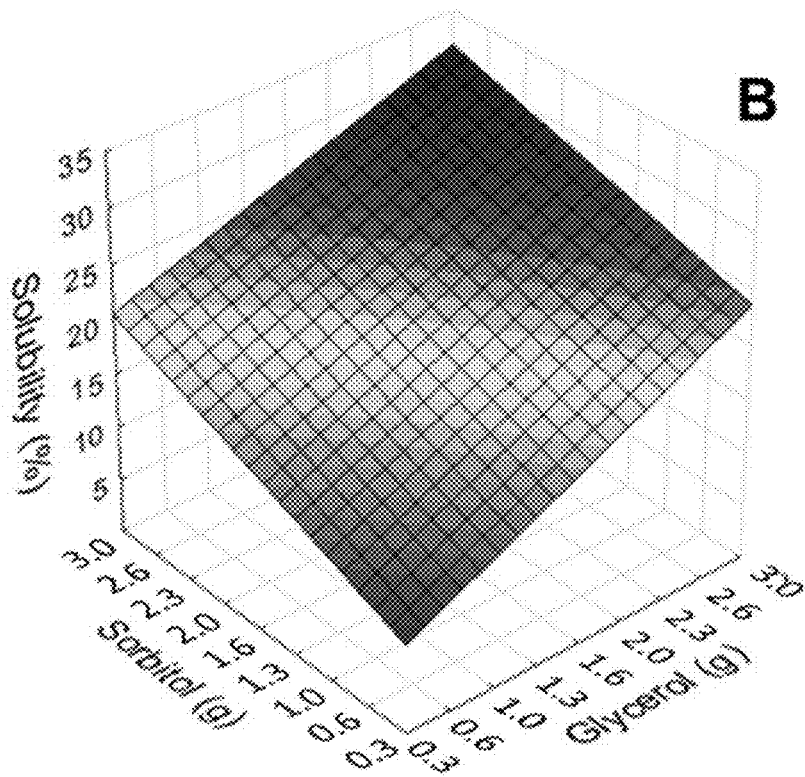
Figure 1C:
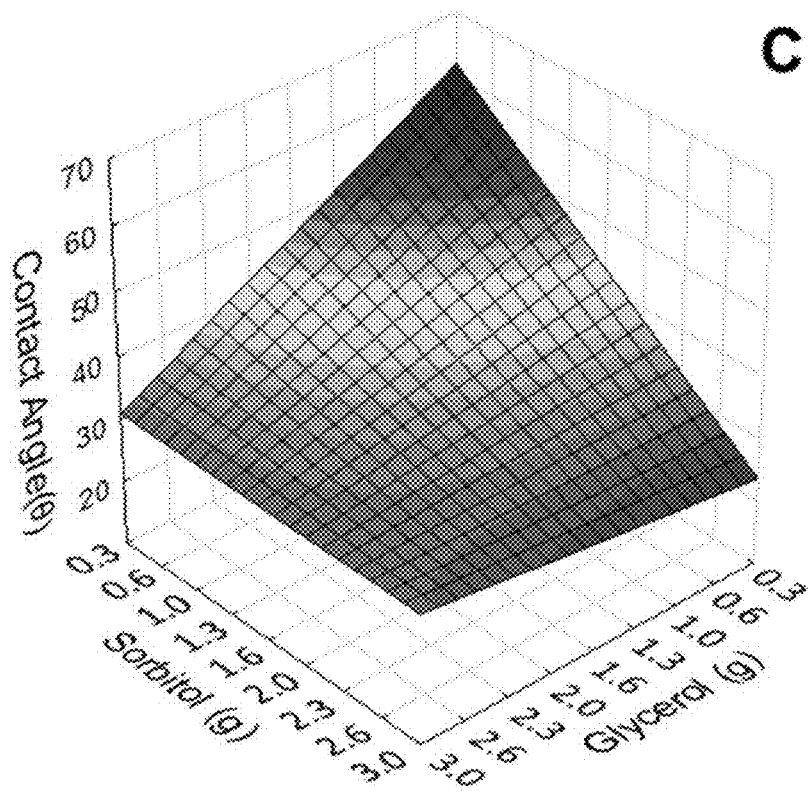
Figure 1D:
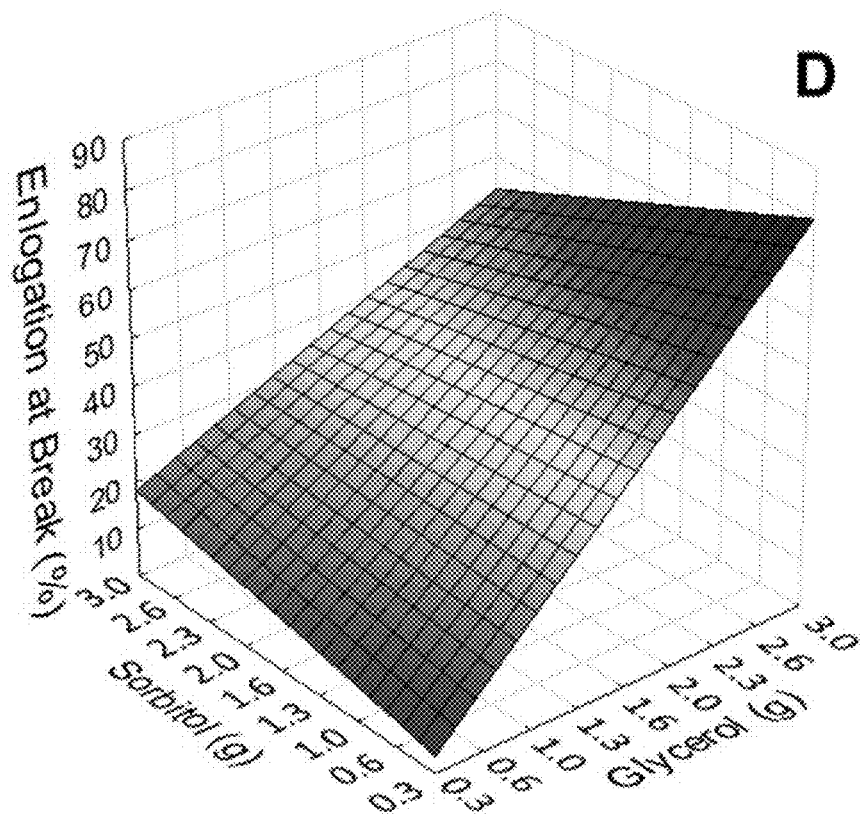

Tavares, L. S., Junqueira, L. A., de Oliveira Guimarães, Í. C., & de Resende, J. V. (2018). Cold extraction method of chia seed mucilage (*Salvia hispanica* L.): effect on yield and rheological behavior. Journal of Food Science and Technology, 55(2), 457-466.

Urbizo-Reyes, U., San Martin-González, M. F., Garcia-Bravo, J., López Malo, A., & Liceaga, A. M. (2019). Physicochemical characteristics of chia seed (*Salvia hispanica*) protein hydrolysates produced using ultrasonication followed by microwave-assisted hydrolysis. Food hydrocolloids, 105187, 10 pgs.

Salazar Vega, I. M., Quintana Owen, P., & Segura Campos, M. R. (2020). Physicochemical, thermal, mechanical, optical, and barrier characterization of chia (*Salvia hispanica* L.) mucilage-protein concentrate biodegradable films. Journal of Food Science, 85(4), 892-902.

Segura-Campos, M. R., Ciau-Solis, N., Rosado-Rubio, G., Chel-Guerrero, L., & Betancur-Ancona, D. (2014). Chemical and functional properties of chia seed (*Salvia hispanica* L.) gum. International journal of food science, 2014, 6 pgs.

Dick, M., Costa, T. M. H., Gomaa, A., Subirade, M., de Oliveira Rios, A., & Flôres, S. H. (2015). Edible film production from chia seed (*Salvia hispanica*) mucilage: Effect of glycerol concentration on its physicochemical and mechanical properties. Carbohydrate polymers, 130, 198-205.

Capitani, M. I., Matus-Basto, A., Ruiz-Ruiz, J. C., Santiago-García, J. L., Betancur-Ancona, D. A., Nolasco, S. M., Tomás, M.C., and Segura-Campos, M. R. (2016). Characterization of biodegradable films based on *Salvia hispanica* L. protein and mucilage. Food and bioprocess technology, 9(8), 1276-1286.

Talja, R. A., Helén, H., Roos, Y. H., & Jouppila, K. (2007). Effect of various polyols and polyol contents on physical and mechanical properties of potato starch-based films. Carbohydrate polymers, 67(3), 288-295.

Othman, S. H., Majid, N. A., Tawakkal, I. S. M. A., Basha, R. K., Nordin, N., Shapi, I., & Ahmad, R. (2019). Tapioca starch films reinforced with microcrystalline cellulose for potential food packaging application. Food Science and Technology, 39(3), 605-612.

Mujtaba, M., Koc, B., Salaberria, A. M., Ilk, S., Cansaran-Duman, D., Akyuz, L., Cakmak, Y.S., Kaya, M., Khawar, K. M., and Boufi, S. (2019). Production of novel chia-mucilage nanocomposite films with starch nanocrystals; An inclusive biological and physicochemical perspective. International journal of biological macromolecules, 133, 663-673.

Salgado-Cruz, M., Calderón-Domínguez, G., Chanona-Perez, J., Farrera-Rebollo, R. R., Méndez-Méndez, J. V., & Díaz-Ramírez, M. (2013). Chia (*Salvia hispanica* L.) seed mucilage release characterisation. A microstructural and Image analysis study. Industrial Crops and Products, 51, 453-462.

Garcia, Maria, A., et al. "Characterization of composite hydrocolloid films", Carbohydrate Polymers 56 (2004) pp. 339-345.

\* cited by examiner

Desirability

ENVIRONMENT FRIENDLY PACKAGING MATERIALS OF CHIA SEED BIOMASS AND THE USES THEREOF

CROSS REFERENCE TO RELATED APPLICATIONS

This present patent application is related to and claims the priority benefit of U.S. Provisional Patent Application Ser. No. 63/115,812, filed Nov. 19, 2020, the contents of which are hereby incorporated by reference in their entirety into this disclosure.

GOVERNMENT SUPPORT CLAUSE

This invention was made with government support under Hatch Act formula funds project 1019794 awarded by the USDA National Institute of Food and Agriculture. The government has certain rights in the invention.

TECHNICAL FIELD

The present application relates generally to a process of manufacturing an optimized packing film comprising chia seed mucilage (CSM), glycerol, and sorbitol, wherein said packaging films have a good tensile strength (2.005 N/mm$^2$), lower water vapor permeability ($1.73 \times 10^{-9}$ g×s×Pa/m), a good flexibility (e.g. high elongation at break, 31.729%). Both the process and the products are within the scope of this application.

BACKGROUND SUMMARY

This section introduces aspects that may help facilitate a better understanding of the disclosure. Accordingly, these statements are to be read in this light and are not to be understood as admissions about what is or is not prior art.

The overuse of petroleum-derived packaging is leading to a high accumulation rate of these materials in the environment. Since 1964, the global use of plastics has expanded 20-fold increasing to 322 million tons in 2015 [1]. Packaged food products are the main culprit of single use plastics, due to the utilization of petroleum-based polymers as primary materials in food packaging. Around 72% of the world's plastic production is not recycled, 40% ends in landfills, and about 32% is estimated to end up in natural habitats, such as biospheres and oceans [2]. Buoyancy and slow degradation rate are the reason of the extensive damage and contamination ability of these plastic compounds [3]. In response to this, the food industry is in search of alternative materials for food packaging consisting of ingredients that increase the biodegradable characteristics of the package. In this regard, plant derived materials have shown great potential, offering similar structural and barrier functionalities as conventional petroleum-based materials.

DRAWINGS AND BRIEF DESCRIPTIONS

Figure 1E:
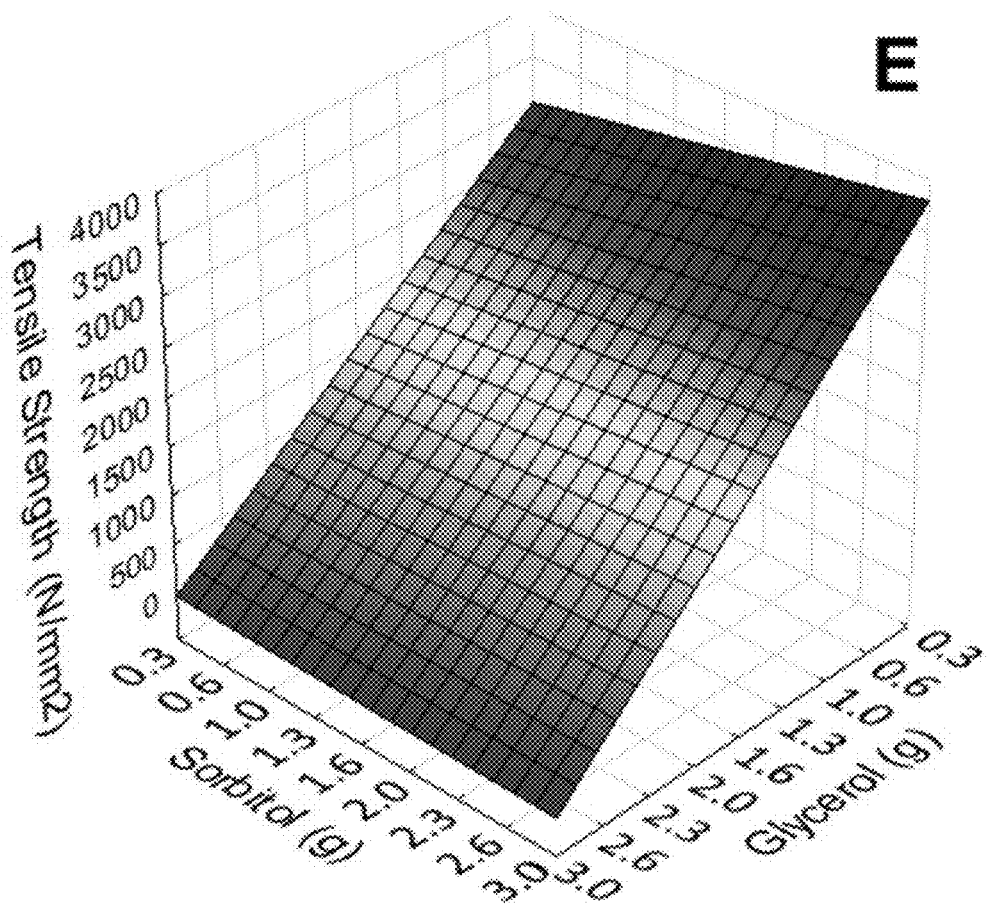

The above and other objects, features, and advantages of the present invention will become more apparent when taken in conjunction with the following description and drawings wherein identical reference numerals have been used, where possible, to designate identical features that are common to the figures, and wherein:

FIGS. 1A-1E. Response surface diagrams depicting the effect of glycerol (g) and sorbitol (g) per gram of chia seed mucilage (CSM) on the response variables: water vapor permeability (FIG. 1A), solubility (FIG. 1B), contact angle (FIG. 1C), elongation at break (FIG. 1D), tensile strength (FIG. 1E).

Figure 2:
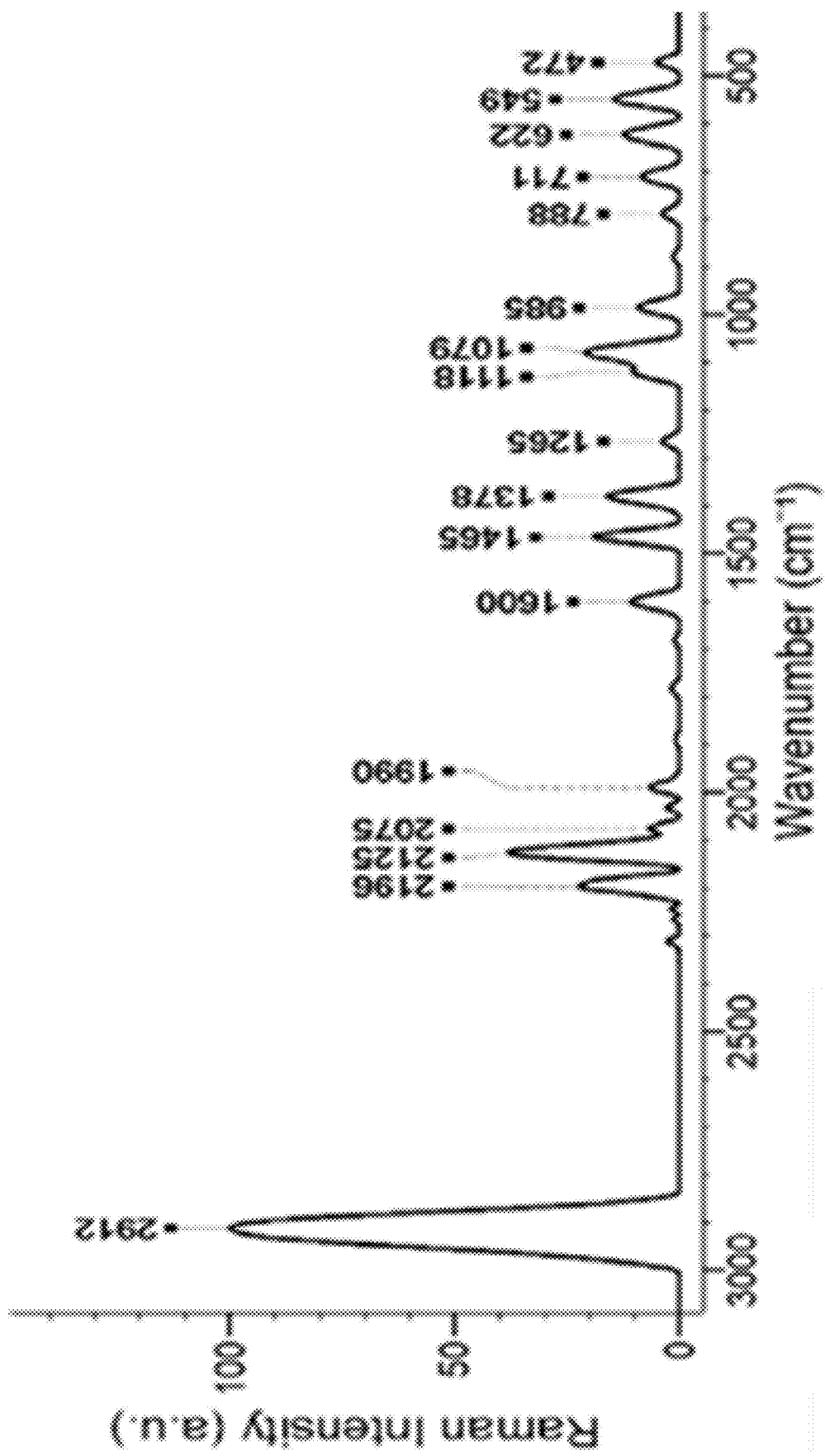

FIG. 2. Raman spectra for chia seed mucilage. Assignment of FT-Raman spectra bands are given in Table 4.

Figure 3A:
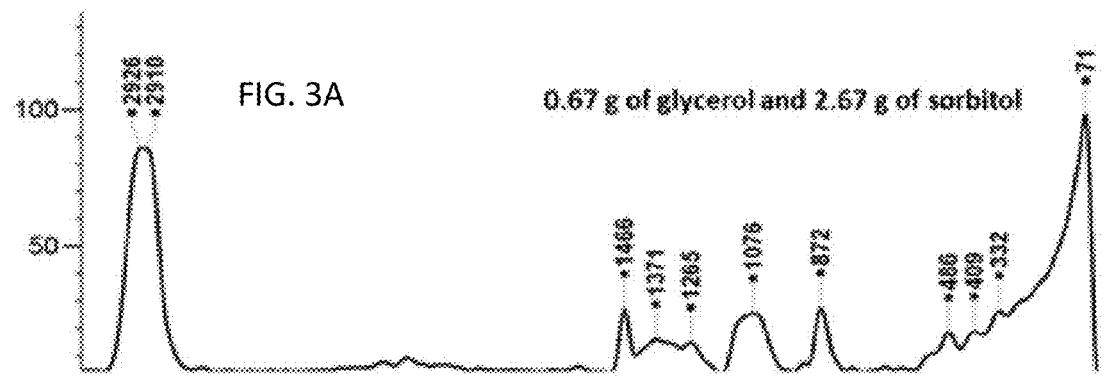
Figure 3B:
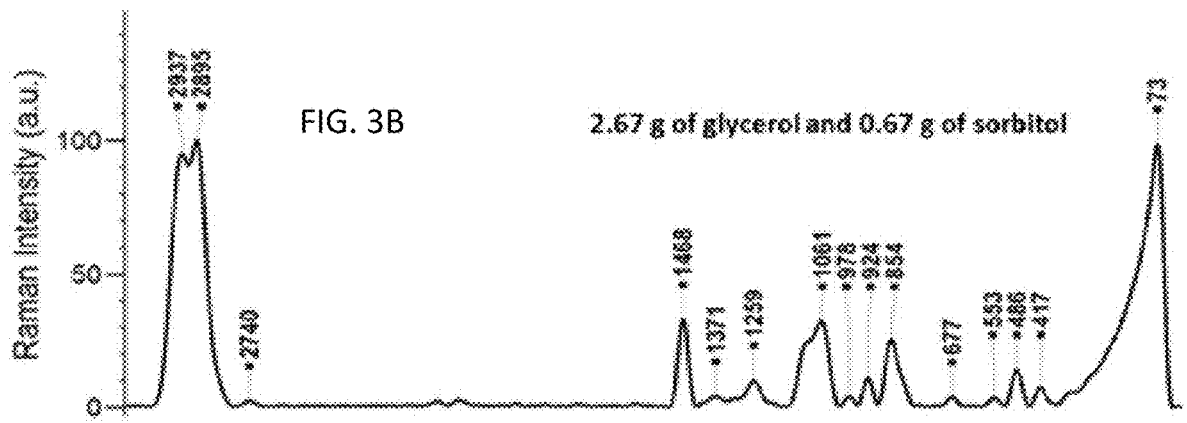
Figure 3C:
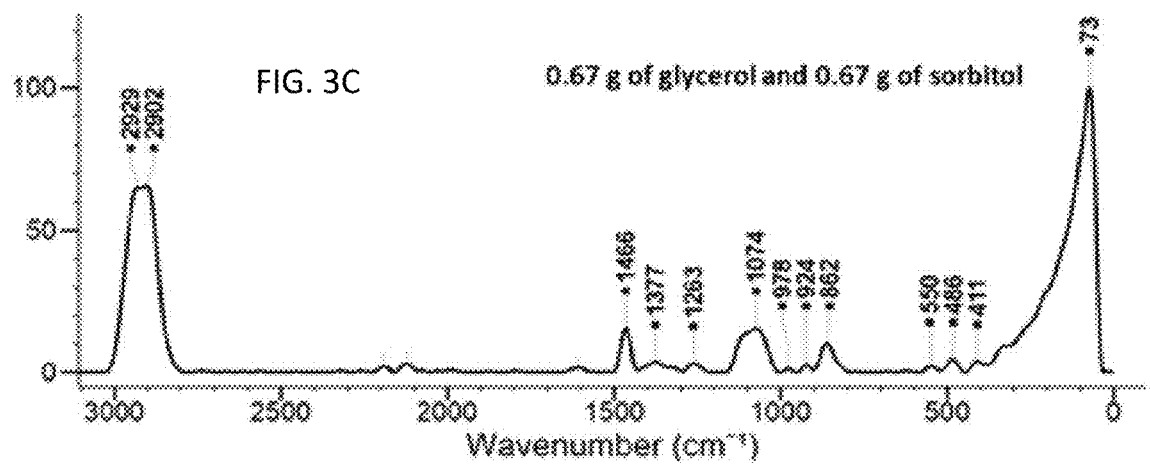

FIGS. 3A-3C. Raman spectra for edible films from chia seed mucilage at different polyol concentrations: FIG. 3A, 0.67 g of glycerol and 2.67 g of sorbitol; FIG. 3B, 2.67 g of glycerol and 0.67 g of sorbitol; and FIG. 3C, 0.67 g of glycerol and 0.67 g of sorbitol. Assignment of FT-Raman spectra bands is given in Table 4.

Figure 4A:
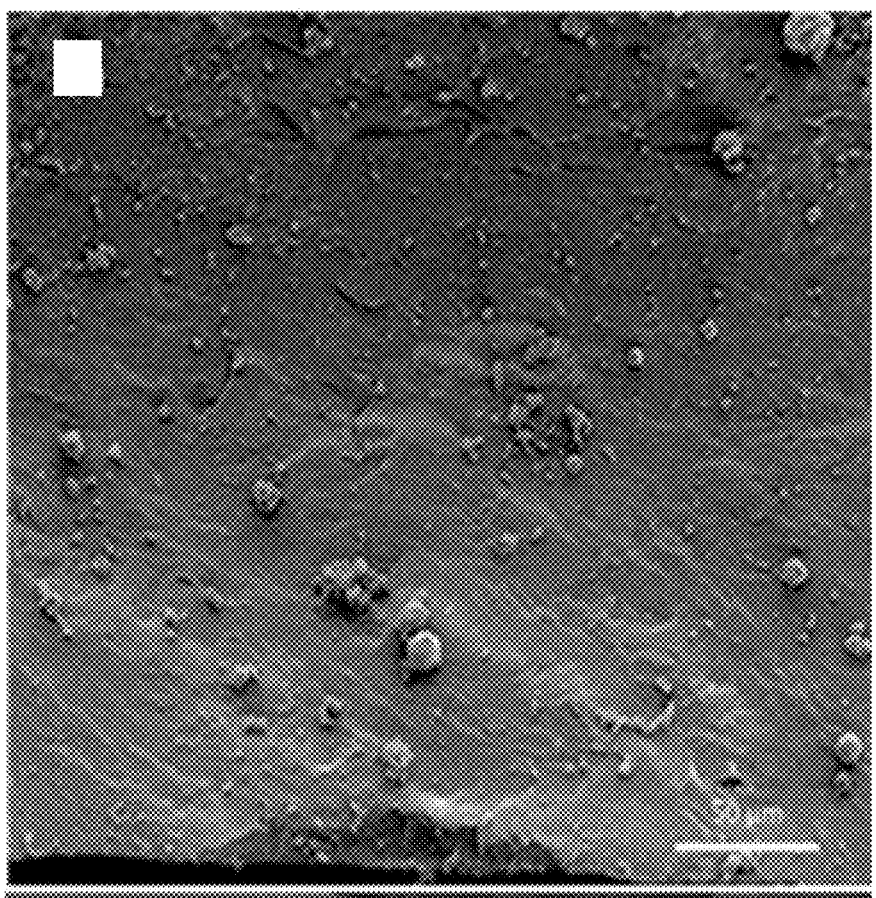
Figure 4B:
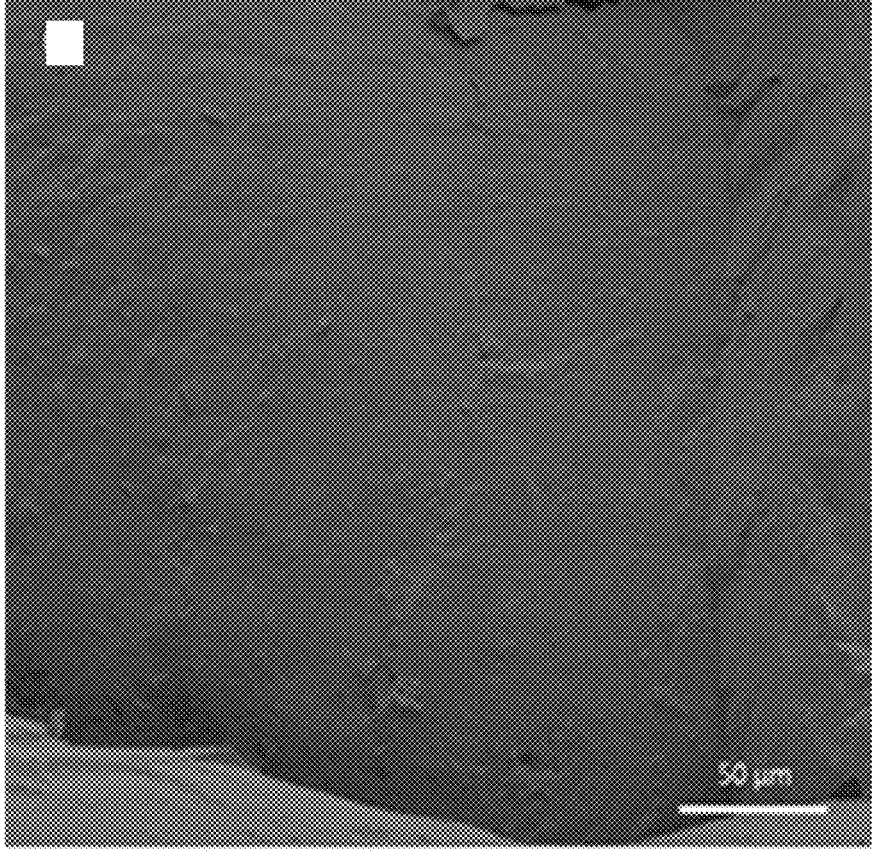

FIGS. 4A-4B. SEM cross-section images of chia seed mucilage films with high content of sorbitol (FIG. 4A) and high content of glycerol (FIG. 4B).

Figures 5A, 5B:
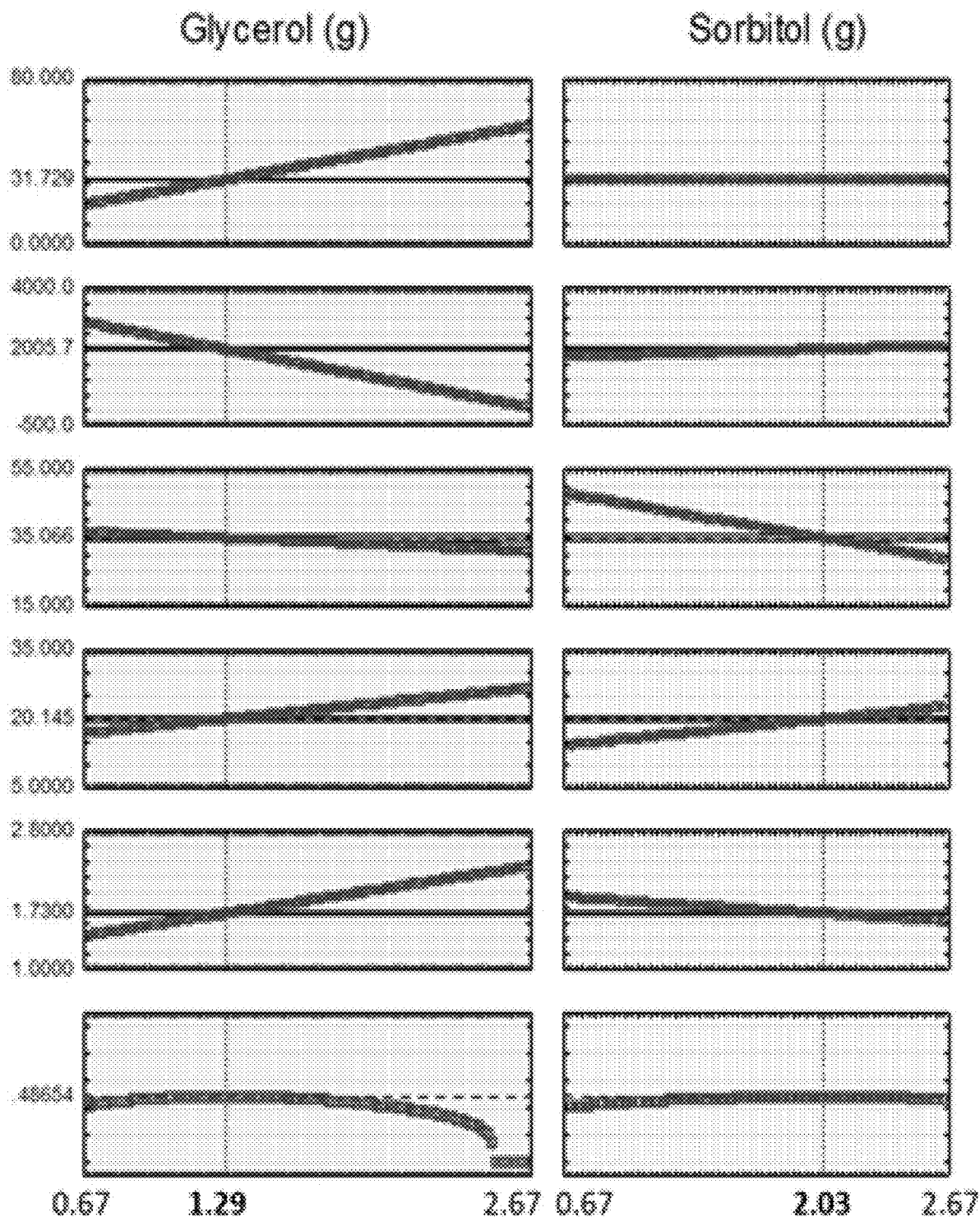
Figure 5C:
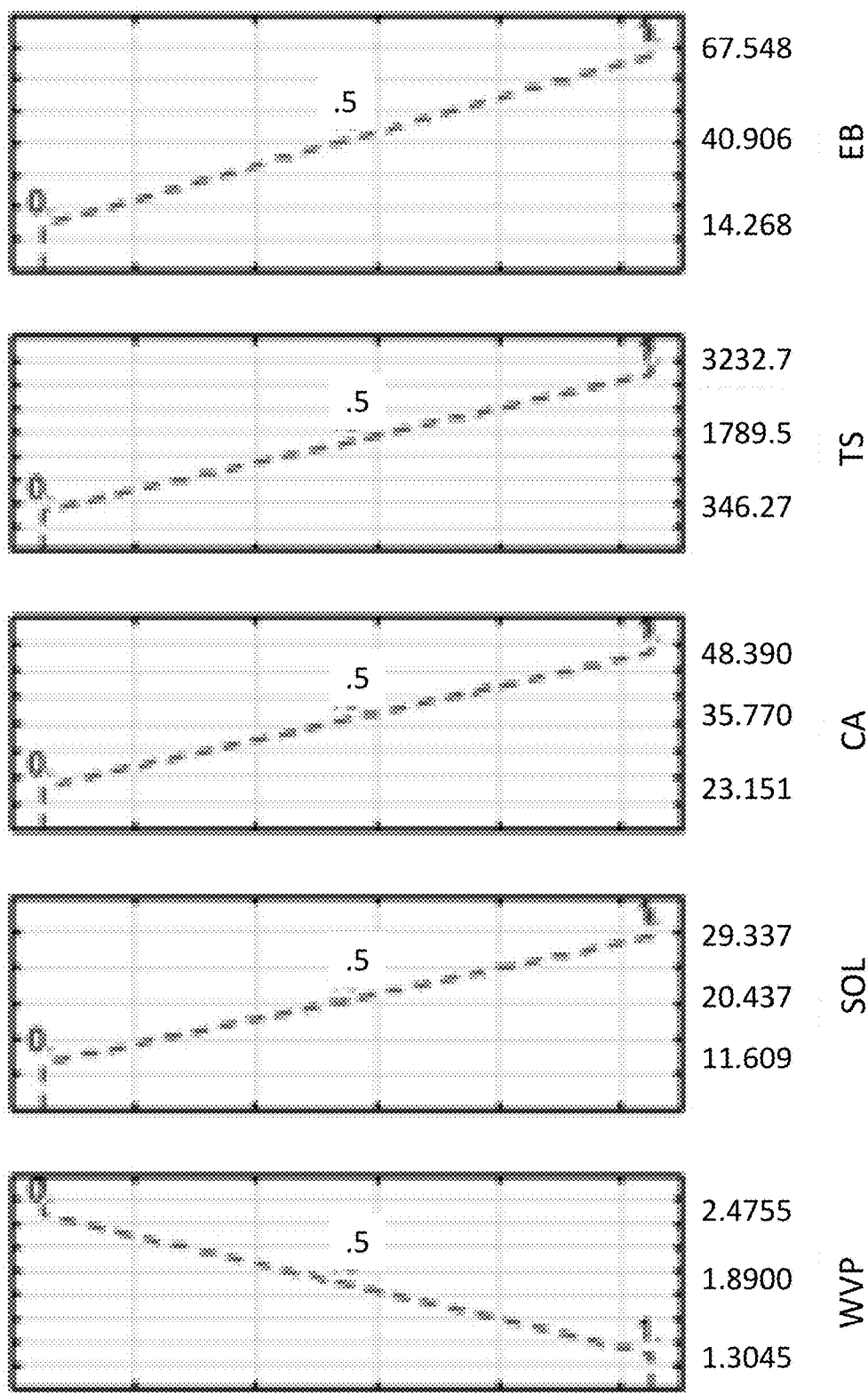

FIGS. 5A-5C. Optimization of edible films from chia seed mucilage. FIG. 5A, optimization of glycerol content; FIG. 5B, optimization of sorbitol content; and FIG. 5C, optimization of desirability.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

As used herein, the following terms and phrases shall have the meanings set forth below. Unless defined otherwise, all technical and scientific terms used herein have the same meaning as commonly understood to one of ordinary skill in the art.

In the present disclosure the term "about" can allow for a degree of variability in a value or range, for example, within 20%, within 10%, within 5%, or within 1% of a stated value or of a stated limit of a range.

In the present disclosure the term "substantially" can allow for a degree of variability in a value or range, for example, within 80%, within 90%, within 95%, or within 99% of a stated value or of a stated limit of a range. Soy and soybean are used exchangeably herein.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In some illustrative embodiments, this disclosure relates to a packaging material comprising chia seed mucilage (CSM), glycerol, and sorbitol.

In some illustrative embodiments, this disclosure relates to a packaging material comprising chia seed mucilage (CSM), glycerol, and sorbitol as disclosed herein, wherein said packaging material is a film having a tensile strength of about 2 N/mm² or higher, a water vapor permeability of about 1.7×10⁻⁹ g×s×Pa/m or lower, and a flexibility of about 30% or higher (e.g., an elongation at break).

In some illustrative embodiments, this disclosure relates to a packaging material comprising chia seed mucilage (CSM), glycerol, and sorbitol as disclosed herein, wherein said packaging material is environmentally friendly and biodegradable.

In some illustrative embodiments, this disclosure relates to a packaging material comprising chia seed mucilage (CSM), glycerol, and sorbitol as disclosed herein, wherein said material comprises CSM about 23%; glycerol about 30%; and sorbitol about 47% (W/W percentage).

In some illustrative embodiments, this disclosure relates to a packaging material comprising chia seed mucilage (CSM), glycerol, and sorbitol as disclosed herein, wherein said CSM comprises about 12% moisture, about 12% proteins, and about 75% carbohydrates.

In some illustrative embodiments, this disclosure relates to a packaging material comprising chia seed mucilage (CSM), glycerol, and sorbitol as disclosed herein, wherein said packaging material is a film used for food packaging.

In some illustrative embodiments, this disclosure relates to a packaging material comprising chia seed mucilage (CSM), glycerol, and sorbitol as disclosed herein, wherein said packaging material is a film used for drug packaging and/or delivery for consumption by human beings and/or animals.

In some illustrative embodiments, this disclosure relates to a packaging material comprising chia seed mucilage (CSM), glycerol, and sorbitol as disclosed herein, wherein the quality of said packaging materials is measured by solubility, water vapor permeability, tensile strength, elongation break, and water contact angle.

In some illustrative embodiments, this disclosure relates to a packaging material comprising chia seed mucilage (CSM), glycerol, and sorbitol as disclosed herein, wherein said packaging material has a high tensile strength and a decreased water vapor permeability if Raman spectra analysis of said packaging material shows a shift from 854 to 872 cm 1 and shift from 1061 to 1076 cm 1, indicating an increase in hydrogen bonding responsible for the high tensile strength and decreased water vapor permeability.

In some illustrative embodiments, this disclosure relates to a process for manufacturing a packaging material using chia seeds mucilage (CSM) comprising the steps of:
 a. preparing a water solution of glycerol and sorbitol;
 b. adding lyophilized CSM to the solution of glycerol and sorbitol and stirring until a homogenous suspension is achieved;
 c. removing air from the homogenous suspension under vacuum; and
 d. casting the homogenous suspension and drying to afford said packaging material.

In some illustrative embodiments, this disclosure relates to a process for manufacturing a packaging material using chia seeds mucilage (CSM) as disclosed herein, wherein said packaging material is a film having a tensile strength of about 2 N/mm² or higher, a water vapor permeability of about 1.7×10⁻⁹ g×s×Pa/m or lower, and a flexibility of about 30% or higher (e.g., an elongation at the breaking point).

In some illustrative embodiments, this disclosure relates to a process for manufacturing a packaging material using chia seeds mucilage (CSM) as disclosed herein, wherein said packaging material is environmentally friendly and biodegradable.

In some illustrative embodiments, this disclosure relates to a process for manufacturing a packaging material using chia seeds mucilage (CSM) as disclosed herein, wherein material comprises CSM about 23%; glycerol about 30%; and sorbitol about 47% (W/W percentage).

In some illustrative embodiments, this disclosure relates to a process for manufacturing a packaging material using chia seeds mucilage (CSM) as disclosed herein, wherein said CSM comprises about 12% moisture, about 12% proteins, and about 75% carbohydrates.

In some illustrative embodiments, this disclosure relates to a process for manufacturing a packaging material using chia seeds mucilage (CSM) as disclosed herein, wherein said packaging material is for edible food/feed coating and packaging for consumption by human beings and animals.

In some illustrative embodiments, this disclosure relates to a process for manufacturing a packaging material using chia seeds mucilage (CSM) as disclosed herein, wherein said packaging material is a film used for drug packaging and/or delivery for consumption by human beings and/or animals.

In some illustrative embodiments, this disclosure relates to a process for manufacturing a packaging material using chia seeds mucilage (CSM) as disclosed herein, wherein the quality of said packaging materials is measured by solubility, water vapor permeability, tensile strength, elongation break, and water contact angle.

In some illustrative embodiments, this disclosure relates to a process for manufacturing a packaging material using chia seeds mucilage (CSM) as disclosed herein, wherein said packaging material has a high tensile strength and a decreased water vapor permeability if Raman spectra analysis of said packaging material shows a shift from 854 to 872 cm⁻¹ and a shift from 1061 to 1076 cm⁻¹, indicating an increase in hydrogen bonding responsible for the high tensile strength and decreased water vapor permeability.

In some illustrative embodiments, this disclosure relates to a process for manufacturing a packaging material using chia seeds mucilage (CSM) as disclosed herein, wherein said drying process is carried out at about 42° C. for about 10 h.

In some other illustrative embodiments, this disclosure relates to a packaging material manufactured using chia seeds mucilage (CSM) according to the process for manufacturing a packaging material as disclosed herein.

Food packaging is one of the main contributors to the high rates of environmental contamination; therefore, interest has emerged on the use of biopolymers as alternative materials to replace conventional food packaging. Chia seed (*Salvia hispanica*) is recognized by having a high content of a polysaccharide called mucilage. The aim of this study was to evaluate the feasibility using of chia seed mucilage (CSM) and a polyol mixture containing glycerol and sorbitol for the development of films. CSM films with higher sorbitol content showed superior tensile strength (3.23 N/mm²) and lower water vapor permeability (1.3*10⁻⁹ g/m*s*Pa), but had poor flexibility compared to other treatments. Conversely, high glycerol content showed high elongation at break (67.55%) and solubility (22.75%), but poor water vapor permeability and tensile strength. Film formulations were optimized implementing a factorial design according to response surface methodology. Raman spectra analysis showed shifts from 854 to 872 cm⁻¹ and 1061 to 1076 cm⁻¹ due to the stretching vibration β(CCO) modes, indicating an increase in hydrogen bonding, responsible for the high tensile strength and decreased water vapor permeability observed in this study. The optimum conditions of polyol concentration were 1.3 g of glycerol and 2.0 g of sorbitol per g of CSM. Based on these results, chia seed mucilage can successfully be used to develop biofilms with potential to be used in drug delivery and edible food coating applications.

Ghanbarzadeh, Almasi, and Entezami [4] developed biodegradable films using cornstarch and showed that the mechanical properties were improved by increasing concentrations of citric acid and carboxymethyl cellulose. Oliveira et al. [5] fabricated films from plant materials using mucilage extracted from leaves of Barbados gooseberry (*Pereskia aculeate*) combined with glycerol as a cross-linker. Because of their chemical composition, mucilaginous compounds offer a great potential alternative to plastics; a very high content of mucilaginous material is known to be present in chia seeds (*Salvia hispanica*). Chia seeds have gained popularity due to their remarkable nutritional composition, including high content of protein (15 to 25%), fat (30-33%) and fiber (41%) [6]. Around 5-7% of the whole chia seed weight corresponds to a complex carbohydrate polymer called mucilage [7]. This polysaccharide is also a by-product generated during the production of chia seed protein hydrolysates, which have shown bioactive properties such as antioxidant activity, DPP-IV and ACE-inhibition [8]. Chia seed mucilage (CSM) has mainly been used as a thickening agent in the development of gluten free pasta [9], breads and cakes [10].

However, a study by Salazar Vega, I. M., Quintana Owen, P., & Segura Campos, M. R. [11] showed that CSM and proteins can be combined to develop edible or biodegradable films with improved physical properties. CSM has a particular high content of xylans (38%) [12], which are the mayor contributors to the crosslinking ability of mucilage films and are known to absorb ten to a hundred times their weight in water. Because of this, the formation of hydrogels by mucilage-water dispersions is ideal to rearrange the residues biaxially, and form films and coatings. In addition, mucilage is high in hemicellulose, which excerpts good barrier properties such as oil resistance and low oxygen permeability [13]. Scientists have successfully developed films using xylans and hemicelluloses by the incorporation of plasticizers into their matrices. A study showed that incorporating glycerol into cassava starch film increased the elongation at break and water vapor permeability but decreased the tensile strength of the films, showing the structural influence of plasticizers such as polyols in the physicochemical characteristics of films [14]. Notably, different polyols will impact the barrier and physicochemical properties of films differently. Therefore, our hypothesis is that the incorporation of polyol mixtures will provide desirable attributes to chia seed mucilage films, and improve their physical and barrier characteristics. For this reason, the objective of this study was to create a value-added product from chia seed mucilage by developing biofilms using two polyol sources (glycerol and sorbitol), optimizing their concentration, and understanding the impact of polyol mixtures on physicochemical, barrier and mechanical properties of the films.

Materials and Methods

Materials

Chia seeds (CS) were purchased from a commercial vendor (Healthworks®, Scottsdale, AZ, USA). Glycerin was purchased from VWR International (Radnor, PA, USA), and sorbitol was purchased from Sigma Aldrich (St. Louis, MO, USA).

Chia Seed Mucilage (CSM) Extraction

Mucilage extraction was done according to Urbizo-Reyes et al. [8]. Briefly, CS were hydrated in distilled water (1:20 ratio by weight) for 24 hours, under refrigerated conditions. Hydrated seeds were pre-heated to 55±2° C. and sonicated at a 75% power input using an ultrasonic cell disruptor (Sonifier® Branson S-150D Danbury, CT, USA). The temperature was maintained constant using a double-walled beaker connected to an immersion circulator control Lauda E100 water bath (Lauda-Königshofen, Germany). Seeds were separated from the mucilage solution using vacuum-assisted filtration. Finally, the mucilage solution was frozen at −85° C. and lyophilized (Labconco FreeZone 2.5 Plus, Kansas City). Dried mucilage powder was stored at 4±2° C. until used.

Proximate Composition

Proximate analysis (moisture, ash, lipid, and protein) of the CSM was done following the AOAC methods 920.153, 960.39, and 984.13 (A-D) respectively [15].

Preparation of Chia Seed Mucilage (CSM) Films

CSM films were developed by casting methods using polyols (glycerol and sorbitol) as plasticizers. First, the polyol mixtures were prepared according to Table 1, then solubilized in 15 mL of distilled water and stirred for 40 min. After this, 0.3 g of lyophilized CSM were added and stirred at 25° C. until a complete homogenous suspension was achieved. Then, the mixture was held under vacuum for 5 min to remove air that was incorporated in the solution. The films were casted in circular aluminum plates with the following dimensions top 2¼"×¾" deep (Thomas Scientific, Swedesboro, NJ) and dried in a tray dryer (Excalibur Dehydrator 3926TCDB, Sacramento, CA) at 42±2° C. for 10 hours. Finally, films were peeled and stored in a desiccator for 24 hours prior analyses.

Color Measurement

The color of the CSM films was determined using the Hunterlab ColorFlex 45°/0° Spectrophotometer (HunterLab ColorFlex, Hunter Associates Inc., Reston, Virginia, USA). The values were determined using the CIELAB, (L*, α* and b*), where (L*) measure the lightness and its value range between 0 to 100 (where 0 corresponds to black color and 100 to white). The chromaticity parameter (α*), the negative values (−α*) corresponds to green color and the positive values (+α*) corresponds to red color. For the chromaticity parameter (b*), negative values (−b*) corresponds to blue color and positive values (+b*) corresponds to yellow color. The color of the films was measured against a white background taking 3 measurements per treatment. The total difference in color was calculated by comparing the films to a standard white tile where (L*=93.46, α*=−0.79, b*=0.11) according to the [Eq.1].

$$\Delta E^* = (\Delta L^*)^2 + (\Delta \alpha^*)^2 + (\Delta b^*)^2 \qquad [\text{Eq.1}]$$

Tensile Strength and Elongation at Break

Tensile strength and elongation at break was calculated as stated by Garcia et al. following the official ASTM standard method D882 [17]. First, the CSM films were cut into 25 mm by 63.5 mm rectangles with a razor blade, and then preconditioned in a desiccator for 24 hours prior to analysis. The maximum tensile strength (g) and elongation at break of CSM films was determined using a TA.XT Plus Texture Analyzer (Texture Technologies Corp., Scarsdale, NY/Stable Micro Systems, Godalming, Surrey, UK) at 25° C. according to [Eq.2] and [Eq.3], respectively.

The thickness of the film was measured four times and the value reported as an average of the readings. The films were deformed at a tensile speed of 1 mm/min.

$$\text{Tensile Strength}\left(\frac{N}{mm^2}\right) = \frac{\text{Breaking force (N)}}{\text{Cross sectional area of the sample } mm^2} \quad [\text{Eq. 2}]$$

$$\text{Elongation Break \%} = \frac{\text{The Increase in length at breaking point (mm)}}{\text{Original length (mm)}} \quad [\text{Eq. 3}]$$

Film Solubility

The CSM film solubility was determined using the method proposed by Rai and Poonia [18]. The films were cut into 2 cm diameter circles and dried at 105° C. to determine moisture content. The precut films were suspended in 50 mL of distilled water and shaken in Erlenmeyer flasks using a Gyratory Shaker (Model G2, New Brunswick Scientific Co. Inc., Edison, NJ) at 25° C. and a rotational speed of 100 RPM for a period of 6 hours. The un-dissolved portions of the films were filtered using a #18 mesh and dried at 105° C. The solubility was calculated according to [Eq.4].

$$\text{Solubility (\%)} = \frac{\text{Initial dry mass} - \text{final dry mass}}{\text{Initial dry mass}} * 100 \quad [\text{Eq. 4}]$$

Water Contact Angle

The water contact angle was determined by the methodology proposed by Gezer, Brodsky, Hsiao, Liu, and Kokini [19], where a VCA Optima contact angle analyzer (AST products, Billerica, MA) was used to photograph 30 s after 2-μL of deionized water was deposited onto the surface of the CSM films. The stable contact angle of the water at the CSM films interface was measured and performed in triplicate for each treatment.

Water Vapor Permeability (WVP)

The WVP was calculated according to Garcia, Pinotti, Martino, and Zaritzky using the E96 method [20]. The films were sealed with metal clamps in 10 cm$^2$ circular opening PVC permeation cells containing anhydrous calcium chloride (0% RH) and stored at 25° C. in a desiccator prior analysis. A 75% relative humidity (RH) gradient was established using a saturated solution of sodium chloride in a desiccator at 25° C. The water vapor transport rate was determined gravimetrically. Ten weight measurements were made, and the change in weight was plotted as a function of time. A regression analysis of each sample was conducted and the slope of the straight line (g/s) was divided by the area (m$^2$) to calculate the water vapor transmission rate (WVTR). Finally, the WVP was calculated according to [Eq.5] and expressed as (10$^{-9}$ g/m*s*Pa)

$$WVP = \left(\frac{WVTR}{S(R1-R2)}\right) * d \quad [\text{Eq. 5}]$$

Where S: the saturation water vapor pressure at 25° C., R1: relative humidity outside the cell, R2: relative humidity inside the cell. The driving force (S(R1-R2)) was determined to be 1753.55 (Pa).

Raman Spectroscopy

The structure characterization of the CSM films was determined using a Bruker FT-Raman spectrometer RFS 100/S (Bruker Optics, Lubeck, Germany) with a germanium detector cooled by liquid nitrogen. CSM films were cut in 2.5 cm by 2.5 cm squares using a razor blade and placed on a steel holder. Raman analysis of the films was conducted at an excitation wavelength of 1064-nm using a ND: YAG laser. A total of 300 scans were collected per sample, at a 4 cm$^{-1}$ of resolution and a laser power of 220 mW. The spectra was collected at a range between 3500 and 73 cm$^{-1}$. The baseline and smoothness of the spectra was first corrected using the software OPUS 6.5 (Bruker, Karlsruhe, Germany). Finally, the main peaks were identified using KnowItAll® (Analytical Edition, ID Expert, Bio-Rad Laboratories, Inc.).

Scanning Electron Microscopy (SEM)

The biofilm samples were prepared cryogenically to develop an even rupture and avoid burning the samples during scanning. Samples were mounted on carbon tape and sputter coated with platinum. Finally, the SEM analysis was implemented on the cross-section of the CSM films using the FEI NOVA nanoSEM Field Emmission SEM (FEI Company, OR, USA) under high vacuum at an accelerating voltage of 5 kV.

Statistical Analysis

The statistical analysis was done using a central composite design, evaluating the influence of the independent variables glycerol ($X_1$) and sorbitol ($X_2$) concentration (g) on the dependent variables ($Y_n$). The response surface methodology (RSM) was conducted using the statistical software Statistica 10.0® (Round Rock, Texas, United States). The quantities of the independent variables were coded as follows (−1, 0 and 1) whereas the central points were codified as (0, 0). The coded and decoded values are shown in Table 1. The number of treatments was established using [Eq.6]. The levels (g) of the polyols were determined by preliminary data, identifying the ideal central point, conditions, and limitations in the incorporation of polyols in the mucilage films. The experiments were repeated three times before analysis.

$$n = 2^k + m \quad [\text{Eq. 6}]$$

wherein $2^k$=factorial points, m=repetitions for the central point, and n=2$^2$+2=6 TRT.

Finally, the independent variables were optimized using a desirability simulation of the software Statistica 10.0®. A 100-step simulation was run according to the values observed in this study. In the optimization process, the dependent variables ($Y_n$) elongation at break, tensile strength, contact angle and solubility were maximized, whereas the water vapor permeability was minimized.

TABLE 1

Coded and decoded levels of polyols incorporated to chia seed mucilage films.

| | Coded variables | | Decoded variables | |
|---|---|---|---|---|
| Treatment | Glycerol | Sorbitol | Glycerol (g/g of mucilage) | Sorbitol (g/g of mucilage) |
| 1* | 0 | 0 | 1.67 | 1.67 |
| 2* | 0 | 0 | 1.67 | 1.67 |
| 3 | −1 | −1 | 0.67 | 0.67 |
| 4 | 1 | −1 | 2.67 | 0.67 |

TABLE 1-continued

Coded and decoded levels of polyols
incorporated to chia seed mucilage films.

| Treatment | Coded variables | | Decoded variables | |
|---|---|---|---|---|
| | Glycerol | Sorbitol | Glycerol (g/g of mucilage) | Sorbitol (g/g of mucilage) |
| 5 | −1 | 1 | 0.67 | 2.67 |
| 6 | 1 | 1 | 2.67 | 2.67 |

*Central point.

Results and Discussion

Proximate Analysis of Chia Seed Mucilage

The proximate composition of CSM showed content of 11.99±0.88% moisture, 11.44±0.37% crude protein, 0.25±0.05% ash, 0.09±0.01% fat, and 76.35±0.60% carbohydrates (calculated by weight difference). The carbohydrate content includes acid detergent fiber of 10.30±1.30%. Proximate composition of CSM, in this study falls within values reported in other studies. Segura-Campos, Ciau-Solís, Rosado-Rubio, Chel-Guerrero, and Betancur-Ancona [21], extracted CSM and reported a higher protein (25%) and fat (26%) content, whereas Timilsena et al., reported lower content of protein (2.6%) and higher fat content (0.6%) on extracted and purified CSM. The compositional differences are attributed to variances involved during mucilage extraction. Nevertheless, the ultrasound-assisted mucilage extraction method used in this study, resulted in higher mucilage extraction yield (7.8%) [8] compared to other physical methods (5.6%) [12]. Ultrasound energy and the high shear forces developed under the sonic field could be responsible for increased protein extraction within the mucilage matrix (11.44±0.37%) compared to mucilage extracted without sonication (8.02±0.45%). For example, Chemat et al. [22] showed how ultrasound developed high shear stresses in the proximity between liquid and solid materials, causing oil to separate from basil leaves, thus addressing the possibility of this application in other food matrices such as chia seed mucilage. In this context, ultrasound frequencies generated microjets in the chia seed surface, which could have targeted tissue structures (i.e., columella) that allowed for the physical separation of mucilage in an efficient way. The molecular composition of the stored mucilage is still unknown, and a possible intramolecular bonding of proteins in the stored mucilage matrix could be the reason why residual proteins are still present in the extracted material. Timilsena et al. [12], hypothesized that a possible covalent linkage might exist between protein and mucilage. It has been widely demonstrated that ultrasonication can help extract other compounds from plant matrices such as proteins, phytochemical compounds, and minerals [22]. Recently, some studies reported an increase on protein extraction when ultrasound was applied to spirulina [23]. Higher protein extraction was attributed to the erosion, shear effects and fragmentation caused during sonoporation, which generated cellular lysis that released protein from plant cells [23].

Chia Seed Mucilage Films Thickness and Color

CSM films were effectively casted in aluminum plates with variating concentrations of polyols (glycerol and sorbitol). Casting in plastic or glass surfaces made film peeling inefficient and laborious. Excessive incorporation of polyols as plasticizers (6.0 g of polyols/g of mucilage, wet basis) resulted in unmanageable films with lack of structure and a syrupy texture. Conversely, low concentration of plasticizers (less than 1.0 g of polyols/g of mucilage, wet basis) resulted in films with poor flexibility which made peeling films from the plate almost impossible. Film thickness depended on treatment and ranged from 0.381 to 0.392 mm. The incorporation of polyols has shown to cause an increase in thickness; this is attributed to an increase of free volume when polyols are incorporated intermolecularly [24]. As a result, this interruption of bond formation caused by plasticizers causes a reduction in the compact structure of the polymer's depositional layer, hence causing an increase in thickness [25]. The films had a slight yellow color as indicated by the color parameters (Table 2). The natural color of these films might serve as a barrier for UV light, allowing the material to serve as a protectant towards photo-oxidative degradation. Dick, Costa, Gomaa, Subirade, de Oliveira Rios, et al. evaluated the UV absorption capacity of chia seed mucilage films and found that light transmittances was very low for the UV regions between 200-280 nm, indicating the potential role of this material as a UV barrier in food packaging. The L* values were significantly lower (darker) ($p<0.05$) for films with higher content of glycerol. Dick, Costa, Gomaa, Subirade, de Oliveira Rios, et al. [26] showed similar results, where the incorporation of glycerol resulted in a decrease in lightness (L*). An increase in glycerol also resulted in increased red (a*) and yellow (b*) colors. The low incorporation of polyols caused overall lower (b*) values (more blueish colors). The total difference in color ($\Delta E$) from the standard white plate was higher ($p<0.05$) for films high in glycerol (treatment 4), and the lowest difference was achieved with low polyol concentrations (treatment 3). This change in color is often attributed to non-enzymatic browning that occurs between glycerol and residual protein in the mucilage matrix [27]. Nevertheless, the films retained a semi-transparent appearance as the polyol composition changed.

Mechanical Properties of Chia Seed Mucilage Films

Edible and biodegradable films developed using biopolymers such as proteins or polysaccharides are brittle and tend to collapse with manipulation. The incorporation of plasticizers is necessary to avoid premature fracture, poor flexibility and improve mechanical properties such as tensile strength, elongation at break, and stickiness of the films [25]. Dick, Costa, Gomaa, Subirade, de Oliveira Rios, et al. showed that incorporating glycerol to CSM increased the elongation and permeability and decreased the tensile strength of the films. In this study, we determined that different polyols had a significant effect ($p<0.05$) in the mechanical properties of the films made from CSM (FIG. 1). The incorporation of glycerol ($X_1$), sorbitol ($X_2$) and their interaction ($X_1*X_2$) had a significant ($p<0.05$) effect in the predicting models (Table 3) of tensile strength ($R^{2=0.91}$) and elongation at break ($R^{2=0.99}$). Films with a higher content of sorbitol exhibited a higher tensile strength (Table 2), whereas films with a high content of glycerol or glycerol-sorbitol concentration showed poor strength. Glycerol is a hydrophilic molecule that consists of a 3-carbon backbone with 3 hydroxyl groups. Because of the small molecular nature of this polyol, it allows it to be inserted in the matrix on the film exposing hydroxyl side groups of the mucilage more efficiently than sorbitol and overall increase the interaction of water molecules [28]. Therefore, the high content of hydroxyl groups from mucilage and glycerol contributes to the incorporation of water molecules, resulting in an increased moisture content that at the same time can increase the molecular mobility of the films [29]. Similarly, Espino- Diaz et al. [30] developed edible films from prickly pear (*Opuntia ficus-indica*) using glycerol as a plasticizer and showed a maximum tensile strength of 0.95 N/mm². Generally edible and biodegradable films have tensile strengths that ranges, between 1-10 N/mm² [31]. The highest tensile strength in this study was achieved with 0.67 g of glycerol and 2.67 g of sorbitol per g of CSM (3.23 N/mm²).

It seems plausible that an increase in interactions between sorbitol-mucilage and mucilage-mucilage is responsible of the high tensile strength of these two films. Another study using pea starch, compared different plasticizers and found that a higher tensile strength was achieved by sorbitol compared to glycerol [32]. For elongation at break, higher values were obtained when a higher content of glycerol was incorporated. Due to the small molecular nature of glycerol, the number of hydroxyl groups is higher in a given volume when compared to sorbitol [28]. The high content of hydroxyl groups incorporated by glycerol and its enhanced contribution in the interruption of crosslinking between mucilage and residual proteins results in an increased moisture content absorbed by the film (Table 2). The plasticizer prevents cross-linking and leads to a decrease in intermolecular forces, reducing the strength of the films, thus enhancing their flexibility.

Other studies reported similar observations, where an increase in clove essential oil and glycerol concentration in chia seed mucilage-protein films, decreased the strength of the films and prevented them from being brittle [33]. Studies indicate that a moderate moisture content might be required in biological-based films in order to increase the molecular mobility of the films and enhance their mechanical properties [29]. Films with a higher glycerol content (2.67 g of glycerol and 0.67 g of sorbitol per g of CSM) reached elongation at break values as high as 68%. Whereas in films with a high content of sorbitol (0.67 g of glycerol and 2.67 g of sorbitol per g of CSM), the elongation at break reach a maximum value of 21%. Talja, Helen, Roos, and Jouppila [34] explored the mechanical properties of edible films made with starch plasticized with different polyols. Their findings showed that films plasticized with sorbitol had the lowest elongation at break compare to xylitol. The difference in elongation at break has been attributed to a possible polyol crystallization, common in sorbitol and xylitol. This process is also known to enhance the crosslinking within the starch network causing differences in mechanical properties [34]. Raman spectra of the films with a low polyol concentration or a high content of sorbitol, showed marked band shifts at 862-872 cm$^{-1}$ and 1061-1076 cm$^{-1}$, corresponding to v(CCO). A possible increase in hydrogen bonding interaction between sorbitol-mucilage and mucilage-mucilage is responsible for the Raman shift in this type of linkages and might explain the overall increased in strength and decrease in elongation.

Water Vapor Permeability (WVP)

Glycerol, sorbitol and their interaction showed a significant ($p<0.05$) effect in the predicting model (Table 3) for WVP ($R^{2=0.96}$). An increased concentration of glycerol, or polyol mixture resulted in higher WVP (FIG. 1). Similarly, Dick, Costa, Gomaa, Subirade, Rios, et al. [26], showed an increase in WVP with an increase in glycerol concentration. They hypothesized that the small molecular size of glycerol, allows the polyol to penetrate the intermolecular matrix, causing a lower amount of polysaccharide-polysaccharide interactions and an overall increase in free volume and molecular movement. On the other hand, films plasticized with sorbitol showed a more compact and rigid structure, limiting the permeation of water vapor molecules through its structure.

As shown by the Raman spectra, band shifts at 862-872 cm$^{-1}$ and 1061-1076 cm$^{-1}$, corresponding to v(CCO) could indicate an increase in hydrogen bonding interaction, thus the formation of this type of bonds led to the formation of a more compact and stronger film, limiting the permeation of water through the matrix. A higher molecular mobility allows water vapor molecules to permeate more easily through the film. Hence, sorbitol being a larger molecule than glycerol, showed a reducing effect in the WVP of the CSM films. Likewise, Antoniou, Liu, Majeed, Qazi, and Zhong compared the WVP of edible films from Tara gum ((*Caesalpinia spinosa*) and found that films made with sorbitol exhibited lower permeability when compared to glycerol films. They attributed this to the lower hydrophilic nature of sorbitol compared to glycerol. In this study the lowest WVP (Table 2) achieved was $1.30*(10^{-9}$ g/m*s*Pa), this value is lower than those reported for tapioca starch-microcrystalline cellulose composite films $3.37*(10^{-8}$ g/m*s*Pa), plantain seed gum $12.77*(10^{-9}$ g/m*s*Pa) and blends of cassava starch $5.05*(10^{-7}$ g/m*s*Pa) [38].

Nevertheless, these observations differ from other studies that evaluated the effect of other polyols in the permeability of starch-gelatin edible films, where the highest WVP was attained when sorbitol was incorporated in the film matrix [39]. It is speculated that a difference in polymer structure is responsible of the difference in the film permeability. The WVP of CSM films is still relatively high, this also can be attributed to the hydrophilic nature of this polysaccharide. A study conducted by Coorey, Tjoe, and Jayasena [40] assessed the functional properties of CSM and identified a high water-holding capacity (267 g/g of mucilage). They associated this to the hydrophilic nature of xylans and arabinoxylans, which are known to absorb hundreds of times their equivalent weight in water.

TABLE 2

Effect of independent variables on response variables on surface and barrier properties of chia seed mucilage films plasticized with glycerol and sorbitol.

| Treatment | Glycerol (g) | Sorbitol (g) | WVP ($10^{-9}$ g/ m × s × Pa) | SOL (%) | CA (θ) | EB (%) |
|---|---|---|---|---|---|---|
| 1* | 1.67 (0) | 1.67 (0) | 2.05 ± 0.25 | 19.65 ± 0.03 | 46.95 ± 4.65 | 41.84 ± 0.49 |
| 2* | 1.67 (0) | 1.67 (0) | 2.30 ± 0.13 | 19.60 ± 0.06 | 48.20 ± 3.02 | 41.73 ± 0.95 |
| 3 | 0.67 (−1) | 0.67 (−1) | 1.62 ± 0.10 | 11.61 ± 0.57 | 48.39 ± 7.02 | 14.27 ± 0.26 |
| 4 | 2.67 (1) | 0.67 (−1) | 2.28 ± 0.39 | 22.75 ± 0.28 | 28.55 ± 3.66 | 67.55 ± 2.54 |
| 5 | 0.67 (−1) | 2.67 (1) | 1.30 ± 0.16 | 20.44 ± 1.15 | 23.15 ± 3.00 | 21.31 ± 0.42 |
| 6 | 2.67 (1) | 2.67 (1) | 2.20 ± 0.45 | 29.34 ± 1.79 | 24.63 ± 1.37 | 51.35 ± 0.89 |

TABLE 2-continued

| Treatment | TS (N/mm$^2$) | Moisture (%) | L | a | b | ΔE |
|---|---|---|---|---|---|---|
| 1* | 977.74 ± 11.80 | 6.67 ± 0.07ab | 50.67 ± 0.08a | 1.76 ± 0.04b | 15.22 ± 0.07ab | 2065.76 ± 0.07b |
| 2* | 991.32 ± 1.60 | 6.82 ± 0.06ab | 50.95 ± 0.51a | 1.74 ± 0.22b | 15.12 ± 0.47b | 2038.41 ± 0.47bc |
| 3 | 2732.39 ± 27.87 | 8.17 ± 0.17a | 51.07 ± 0.33a | 1.64 ± 0.09b | 14.28 ± 0.24d | 2003.95 ± 0.24c |
| 4 | 346.28 ± 8.98 | 7.06 ± 0.93ab | 49.42 ± 0.02b | 2.12 ± 0.08a | 15.55 ± 0.22a | 2186.26 ± 0.22a |
| 5 | 3232.67 ± 22.53 | 4.66 ± 0.22b | 50.94 ± 0.66a | 1.62 ± 0.19b | 14.61 ± 0.12cd | 2023.90 ± 0.12bc |
| 6 | 375.52 ± 3.53 | 5.22 ± 0.74b | 50.79 ± 0.26a | 1.65 ± 0.13b | 14.94 ± 0.25bc | 2046.18 ± 0.25bc |

*central points. Coded values (n) are shown as follows:
WVP: water vapor permeability, SOL: solubility, CA: contact angle, EB: elongation at break, TS: tensile strength, L: lightness, a: (−) green to (+) red, b: (−) blue to (+) yellow, ΔE: total difference in color.
Values represent mean ± standard deviation from triplicate determinations.
Different letters (a, b, c) in the same column indicate significant difference (p <0.05).

TABLE 3

Statistical models for response variables, as a function of independent variables grams (g) of glycerol ($X_1$) and sorbitol ($X_2$) per gram of mucilage.

| Response variables | Statistical model | F value | $R^2$ |
|---|---|---|---|
| WVP* | $y = 1.49 + 1.40x_1 − 0.55x_2 − 0.11x_1x_2$ | 52.64 | 0.96 |
| SOL | $y = 4.69 + 19.82x_1 + 15.97x_2 − 6.25x_1x_2$ | 115.46 | 0.98 |
| CA | $y = 65.78 − 44.90x_1 + 53.90x_2 − 59.21x_1x_2$ | 5.22 | 0.99 |
| EB | $y = −7.36 + 101.70x_1 + 24.64x_2 − 64.53x_1x_2$ | 26.02 | 0.99 |
| TS | $y = 3079.61 − 3715.17x_1 + 1095.48x_2 − 1308.43x_1x_2$ | 249.93 | 0.91 |

*WVP: water vapor permeability, SOL: solubility, CA: water contact angle, EB: elongation at break, TS: tensile strength.

Water Contact Angle

Water contact angle measures the angle formed by a water droplet when it is deposited on the surface of a film. This is a way of determining the hydrophobic nature of the surface of a material. This measurement provides an insight of the 'surface affinity for water' depending on the relative magnitude of cohesive and adhesive molecular forces that exist within a liquid and a solid, and hence will be of high importance in understanding how a biological-based film will work on different environments (e.g., fruit coating, nano-encapsulation) [41]. This method is based on image processing and a curve fitting technique, analyzing the contact angle of the water droplet with the baseline and the tangent of the drop boundary when deposited on a surface [41]. The contact angle (θ), provides information of the wettability of a surface, where a film is categorized as a hydrophilic (θ<90) or a hydrophobic (θ>90) boundary [41]. In this study, glycerol, sorbitol and their interaction showed a significant (p<0.05) effect in the predicting model ($R^2$-0.99) for contact angle (Table 3).

An increase in both polyols caused a decreased in the contact angle, whereas a decrease in polyols increased it (FIG. 1). The contact angle was maintained between 46-48, as the polyols increased the contact angle to reach maximum values of 48.39 at the central points (1.67 g of glycerol and 1.67 g of sorbitol per g of CSM). Nevertheless, the incorporation of more than 3.34 g of a polyol per g of mucilage showed to decrease the water contact angle drastically (Table 2). The low contact angle values are related to the hydrophilic nature of mucilage fibers and polyols. CSM is a biomolecule composed of a branch of saccharides and acids that are hydrophilic in nature, these saccharides include xylans, arabinose, glucose, galactose, glucuronic acid and galacturonic acid [12]. Similarly, Mujtaba, et. al., [43] saw an increasement in water contact angle of chia seed mucilage films as the content of starch nanocrystals increased, they attributed this to the plasticizing effect of the nanocrystals, which form a loose structure and prevents intermolecular relationships, thus exposing side branches and attracting more water to the film's surface. The incorporation of the polyols as plasticizers may increase the hydrophilicity. Similarly, Jouki, Yazdi, Mortazavi, and Koocheki [42], evaluated the water contact angle of edible films made with quince seed ((Cydonia oblonga) mucilage and showed that the contact angle decreases with an increase in glycerol content. Most authors attribute a decrease in contact angle to the hydrophilic nature of polyols, which cause a decrease in the hydrophobicity of polysaccharide films [42]. The same behavior has been reported for other edible films made from whey proteins, psyllium gum and Tara gum [35] [44] [45].

Film Solubility

Glycerol, sorbitol and their interaction showed a significant (p<0.05) effect in the predicting model ($R^2$=0.98) for film solubility (Table 3). The increased content of polyols resulted in a higher solubility (FIG. 1). No apparent trend was observed in film solubility when plasticized with sorbitol and glycerol. Films plasticized with a low concentration of polyol mixture had the lowest solubility (11.61%). It seems plausible that the low quantity of polyols allowed the films to maintain a rigid structure and higher hydrophobicity, as shown from the contact angle values. Other researchers reported similar trends, where glycerol was relatively more efficient to increase the solubility of the films; this was attributed to the lower molecular weight of glycerol, that increased the exposure of hydroxyl groups and resulted in higher water binding [46]. However, both polyols are hydrophilic and increasing their content will increase the water solubility of the films, with values as high as 29.34%. In preliminary trials, the films were completely solubilized within 12 h. These films have high capacity to absorb moisture due to their hydrophilic nature, thus limiting their functionality as a moisture barrier. However, their molecular attributes make them suitable for other applications such as oil/grease barriers and oxygen barrier [47]. Other applications of xylan-rich films include nanoencapsulation and delivery of drugs such as ibuprofen; in this regard, these materials offer ideal release times of drugs due to their soluble nature [48]. Ultimately, optimum film solubility will depend on the type of product and desired function. Generally, food needs to be protected from moisture migration to keep the food quality at optimum condition prior to consumption. The solubility, hydrophilic nature of these films might be desirable in some type of products that require a broad range of solubility, such as delivery of bioactive compounds, fruit coatings, soft gel capsules, microcapsules, among others [31].

Raman Analysis of Chia Seed Mucilage and Chia Seed Mucilage Films

The corresponding assignment of the FT-Raman spectra bands is shown in (Table 4). The Raman spectra of CSM (FIG. 2) and CSM films (FIG. 3) showed very defined spectra corresponding to the regions of 73-600, 600-1600 and 2900-2930 $cm^{-1}$. In the 73-600 $cm^{-1}$ region we see a predominant peak (73 $cm^{-1}$) for both CSM and CSM films, corresponding to the skeletal structure of CSM [49]. Auzanneau, Combes, and Zwick [50] identified very low frequencies (<300 $cm^{-1}$) as intermolecular hydrogen-bond stretching and bending, generally present in the skeletal structures of polysaccharides. Authors have also reported this region as corresponding to dipole-dipole interactions. One of the main differences found between CSM and CSM films was observed at the band located at 486 $cm^{-1}$. Wiercigroch et al. [51] associated this band to glycosidic linkages in polysaccharides β(COC) and ring deformations usually present in polyols and starches (amylose and amylopectin) as $C_1OC_4$ glucosidic bond. The band at 549 $cm^{-1}$ is principally associated with glyosidic vibration β(OCO) bonds of maltose [51]. For the 600-1600 $cm^{-1}$ region, the peak at 677 $cm^{-1}$ is observed in the CSM film containing high glycerol concentrations (2.67 g of glycerol and 0.67 g of sorbitol per g of CSM), and it is associated to δ(CC) bending in glycerol [52]. Mendelovici et al. [29] evaluated the effect of cryogenic treatments on glycerol and determined that this peak remains unchanged when hydrogen bonding is induced.

A slightly different Raman shift was observed in every CSM film at the frequencies of 854, 862 and 872 $cm^{-1}$. Mendelovici et al. [29] associated the Raman peak of 852 $cm^{-1}$ to symmetric stretches in glycerol β(CCO), where these bonds showed not to be involved in hydrogen bonding when glycerol is treated cryogenically. In a study conducted by De Veij, Vandenabeele, De Beer, Remon, and Moens [53], a shift of the β(CCO) stretching vibration occurred by increasing the carbons and number of OH groups of the polyols, 851 $cm^{-1}$ for xylitol, and 878 $cm^{-1}$ for sorbitol. The Raman shift aligns to the results of this study, where the CSM films with a high content of sorbitol presented the higher shift (872 $cm^{-1}$), conversely the lowest frequency (854 $cm^{-1}$) was achieved when a low content of sorbitol and a high content of glycerol were incorporated. Bands at 924 and 978 $cm^{-1}$ were observed in films plasticized with at least 50% of glycerol (g of glycerol/g of polyols), but not in films with high content of sorbitol (FIG. 3).

Similarly, Mendelovici et al. found peaks at 928 and 987 $cm^{-1}$ in Raman spectra of glycerol and assigned these observations to vibrations modes of polyols β(CCH). Additionally, they reported Raman peak shifts in this frequency when the material was cooled down, suggesting the shift observed in this study might be caused by hydrogen bonding. In a study using starch-based films, peaks between 920-960 $cm^{-1}$ were assigned to glyosidic linkages developed by hydrogen bonding of the glycerol with films [54]. One of the main differences was observed between the frequency range of 1061-1076 $cm^{-1}$, assigned to stretching vibration in polyols ν(CCO). The films plasticized with a minimum of 50% of sorbitol (g of sorbitol/g of polyols) showed peaks at a Raman frequency higher (1074-1076 $cm^{-1}$) than films with higher glycerol content (1061 $cm^{-1}$). These films also showed the highest tensile strength (Table 2), we hypothesize that an increase in network bonding between mucilage-mucilage and mucilage-protein is responsible for these observations. Similarly, Mendelovici et al. observed a similar Raman shift in the symmetric ν (CCO) stretching modes (1054 $cm^{-1}$), when treating glycerol cryogenically, attributing this to the increasing number of hydrogen bonding and network formation between molecules. This band (1054 $cm^{-1}$) is commonly present in sorbitol and other polyols such as mannitol [53].

Additionally, the presence of protein in the mucilage matrix might play a role in the formation of highly resistant films when low polyol concentrations was present. Nobrega et al. [54] assessed the Raman spectrum of oat globulins and identified peaks at 1245 and 1450 $cm^{-1}$ as amide III (disordered structure) and (C—H bending) correspondingly. In this study, similar bands where observed at 1265 and 1465 $cm^{-1}$ in CSM. A slight shift in this region was observed from 1259 to 1265 $cm^{-1}$ for films plasticized with at least 50% of sorbitol (g of sorbitol/g of polyols); the Raman shift increased with increasing sorbitol concentration. This shift might suggest a protein-sorbitol interaction, causing an increase in bond formation. In summary, CSM films containing a low polyol concentration or a high content of sorbitol, showed very marked band shifts at 862-872 $cm^{-1}$ and 1061-1076 $cm^{-1}$, corresponding to ν(CCO). We hypothesize that a possible increase in interaction between sorbitol-mucilage and mucilage-mucilage is responsible for the shift in this type of linkages and might explain the high mechanical properties of these two films. The bands at 472, 549, 1118, and 1379 $cm^{-1}$ are typically observed in most polysaccharides such as starch and mucilage, and are attributed especially to $CH_2OH$ [54]. Most of these bands correspond to the glucose fingerprint observed in both the CSM and its films [51]. The region corresponding to 2900-2930 $cm^{-1}$ has been associated with the presence of pentose and hexoses. Zhang, Chen, Ramaswamy, Kim, and Xu [55] and Kačuráková et al. [56] have identified the region between 2800-2900 $cm^{-1}$ to be associated with high content of D-xylose and glucose, commonly referred as ν (CH)-vibrations. It is known that CSM contains around a 38% of xylans [12]. This hemicellulose is one of the most abundant biopolymers in the plant kingdom, its structural composition is usually described as multiple side chains bonded to a backbone of linear chains corresponding to (1→4)-linked β-D-xylopyranosye [57]. Xylans generally form a net-like cross-linked structure, and since their side chains are mainly composed of hydroxyl groups; this provides them with high water dispersibility and water holding capacity, making them suitable materials for encapsulation and film development applications [13].

Scanning Electron Microscopy (SEM)

SEM analysis was implemented to study the cross-section of the chia seed mucilage films (FIG. 4) with high content of glycerol (2.67 g of glycerol and 0.67 g of sorbitol per g of CSM) and sorbitol (2.67 g of glycerol and 0.67 g of sorbitol per g of CSM). The microscopic images of CSM films developed with a high content of sorbitol (FIG. 4A) reveals the formation of what appears to be crystals that would play a crucial role in the mechanical properties of the edible films. Similar SEM observations are described for alginate films plasticized with mannitol, where an even distribution of polyol crystals was reported throughout the surface of the films [60]. Similarly, Thirathumthavorn & Charoenrein, showed that sorbitol crystallization impacted the mechanical properties of tapioca (*Manihot esculenta*) starch films increasing the tensile strength through time. The occurrence of such crystals has also been observed in sorbitol-plasticized whey films when stored at a relative humidity below 50%, where crystal formation becomes evident in films increasing the rigidity and the interaction with whey protein [59]. In the case of CSM film with a high content of glycerol a smooth and homogeneous surface was observed (FIG. 4B) indicating good structural integrity.

TABLE 4

Raman Spectra and band assignments (cm$^{-1}$) for chia seed mucilage and its films.

| Chia seed mucilage | 2.67 g GLY + 0.67 g SOR | 0.67 g GLY + 2.67 g SOR | 0.67 g GLY + 0.67 g SOR | Band assignment |
|---|---|---|---|---|
| 73 | 73 | 71 | 73 | skeletal structure (δs(C—C)) |
| — | — | 332 | — | β(CCO), t(COHO) |
| — | 417 | 409 | 411 | δ(CCO) |
| 472 | — | — | — | β(CCO) |
| — | 486 | 486 | 486 | β(COC) |
| 549 | 553 | — | 550 | β(OCO) |
| 622 | — | — | — | β(COC) |
| — | 677 | — | — | δ(CC) |
| 711 | — | — | — | γ(OH) |
| 788 | — | — | — | β(CCC), β(CCO), β(OCO) |
| — | 854 | — | — | ν(CCO) |
| — | — | — | 862 | ν(CCO) |
| — | — | 872 | — | ν(CCO) |
| — | 924 | — | 924 | β(CCH) β (COH) |
| — | 978 | — | 978 | ν(CO) ring, β(CCH) |
| 985 | — | — | — | ν(CCO) |
| — | 1061 | — | — | ν(CCO) |
| 1079 | — | 1076 | 1074 | ν(CCO), β(COH) |
| 1118 | — | — | — | νs(COH) from C-2 |
| 1265 | 1259 | 1265 | 1263 | Amide III |
| 1378 | 1371 | 1371 | 1377 | ω(CH2) |
| 1465 | 1468 | 1466 | 1466 | δ(CH2) δ(CCH) |
| 1600 | — | — | — | ν(CO)ν(CC) |
| 1990 | — | — | — | NI* |
| 2075 | — | — | — | NI |
| 2125 | — | — | — | NI |
| 2196 | — | — | — | NI |
| 2912 | 2895 | 2910 | 2902 | νs(CH2) |
| — | 2937 | 2926 | 2929 | νs(CH2) |

*NI: not identified, GLY: glycerol, SOR: sorbitol, (—): band was not present, ν: stretching; s: symmetric, β: in-plane bending, δ: scissoring, ω: wagging, τ: twisting, γ: out of plane bending.

Optimization

The polyol content of CSM films was optimized using a desirability simulation, running a 100-step simulation according to the values observed in this study. In the optimization process, the dependent variables elongation at break, tensile strength, contact angle and solubility were maximized, whereas the water vapor permeability was minimized. The simulation (FIG. 5) estimated the optimum conditions to be at 1.29 g of glycerol and 2.03 g of sorbitol per every g of mucilage. This process might be useful for development of food coatings, nanoencapsulation and oxygen barrier, hence the desired parameters might be adjusted accordingly to required characteristics. Other studies have optimized film composition according to plasticizer and mucilage content [5]. Future studies in these films need to be conducted, evaluating the food applications, and how different polyols interact with food (e.g., fruits and vegetables) or micro- and nano-encapsulation of bioactive components.

CONCLUSION

Chia seed mucilage, as other biomolecules, has great potential in the development of biodegradable materials from plants. In this study, chia seed mucilage films were effectively developed by casting methods using polyol (glycerol and sorbitol) mixtures as plasticizers to improve their film forming properties. This research showed that each polyol imparts unique properties to the films and that the ideal content or mixture will depend on the intended use of the material. In this regard, the utilization of both polyols, sorbitol and glycerol, in combination showed to significantly ($p<0.05$) impact the physical and barrier properties of chia seed mucilage films. Sorbitol provided the films with higher strength and a certain degree of hydrophobicity, whereas glycerol provided an increase in elongation at break, flexibility and hydrophilicity of the films. Raman spectroscopy revealed marked band shifts at 862-872 cm$^{-1}$ and 1061-1076 cm$^{-1}$, corresponding to (CCO), and confirming that hydrogen bonding is induced with low polyol concentration or a high sorbitol content, resulting in more compact, stronger, less permeable and less flexible films. The applications of this material might need to be geared towards products that do not require low water vapor permeability and relatively fast solubility, such as nanoencapsulation and micro-delivery carriers. Furthermore, the hygroscopic nature of chia seed mucilage films can potentially confer good barrier properties towards oxygen transfer. Future studies should focus on applying this material with the optimum polyol mixture in such environments to understand its behavior and develop further applications.

While this invention has been described as having an exemplary design, the present invention may be further modified within the spirit and scope of this disclosure. This application is therefore intended to cover any variations, uses, or adaptations of the invention using its general principles.

Those skilled in the art will recognize that numerous modifications can be made to the specific implementations described above. The implementations should not be limited to the particular limitations described. Other implementations may be possible.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected. It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

The invention claimed is:

1. A packaging material comprising chia seed mucilage (CSM), glycerol, and sorbitol wherein said material comprises CSM about 23%; glycerol about 30%; and sorbitol about 47% (W/W percentage).

2. The packaging material according to claim 1, wherein said packaging material is a film having a tensile strength of about 2 N/mm$^2$ or higher, a water vapor permeability of about $1.7 \times 10^{-9}$ g×s×Pa/m or lower, and a high elongation at break of about 30% or higher.

3. The packaging material according to claim 1, wherein said packaging material is biodegradable.

4. The packaging material according to claim 1, wherein said CSM comprises about 12% moisture, about 12% proteins, and about 75% carbohydrates.

5. The packaging material according to claim 1, wherein said packaging material is a film used for food packaging.

6. The packaging material according to claim 1, wherein said packaging material is a film used for drug packaging and/or delivery for consumption by human beings and/or animals.

7. The packaging material according to claim 1, wherein the properties of said packaging materials is measured by solubility, water vapor permeability, tensile strength, elongation break, and water contact angle.

8. The packaging material according to claim 1, wherein said packaging material has a tensile strength of about 2 N/mm$^2$ or higher, and a water vapor permeability of about $1.7 \times 10^{-9}$ g×s×Pa/m or lower if Raman spectra analysis of said packaging material shows a shift from 854 to 872 cm$^{-1}$ and shift from 1061 to 1076 cm$^{-1}$, indicating an increase in hydrogen bonding responsible for the high tensile strength and water vapor permeability.

\* \* \* \* \*